United States Patent
Liu et al.

(10) Patent No.: US 10,759,686 B2
(45) Date of Patent: Sep. 1, 2020

(54) METHOD FOR PREPARING THINNING CERAMIC ADDITIVE USING LANDFILL LEACHATE

(71) Applicants: FuZhou University, Fujian (CN); Fujian BoYi Environmental Protection Technology Co., LTD., fuzhou, Fujian (CN)

(72) Inventors: Minghua Liu, Fujian (CN); Yuqing Zhang, Fujian (CN); Yifan Liu, Fujian (CN); Yuancai Lv, Fujian (CN); Xiaoquan Li, Fujian (CN)

(73) Assignees: FuZhou University, Fujian (CN); Fujian BoYi Environmental Protection Technology Co., LTD., Fujian (CN)

(*) Notice: Subject to any disclaimer, the term of this patent is extended or adjusted under 35 U.S.C. 154(b) by 143 days.

(21) Appl. No.: 16/310,453

(22) PCT Filed: Jan. 23, 2018

(86) PCT No.: PCT/CN2018/073742
§ 371 (c)(1),
(2) Date: Dec. 17, 2018

(87) PCT Pub. No.: WO2018/137596
PCT Pub. Date: Aug. 2, 2018

(65) Prior Publication Data
US 2019/0263698 A1    Aug. 29, 2019

(30) Foreign Application Priority Data
Jan. 24, 2017   (CN) .......................... 2017 1 0062865

(51) Int. Cl.
| | |
|---|---|
| *C02F 9/00* | (2006.01) |
| *C04B 35/63* | (2006.01) |
| *C04B 35/634* | (2006.01) |
| *C08F 289/00* | (2006.01) |
| *C02F 1/00* | (2006.01) |
| *C02F 1/52* | (2006.01) |
| *C02F 1/66* | (2006.01) |
| *C02F 103/06* | (2006.01) |

(52) U.S. Cl.
CPC ............ *C02F 9/00* (2013.01); *C04B 35/6303* (2013.01); *C04B 35/63444* (2013.01); *C08F 289/00* (2013.01); *C02F 1/001* (2013.01); *C02F 1/5236* (2013.01); *C02F 1/66* (2013.01); *C02F 2103/06* (2013.01); *C04B 2235/349* (2013.01); *C04B 2235/442* (2013.01); *C04B 2235/447* (2013.01); *C04B 2235/448* (2013.01)

(58) Field of Classification Search
CPC .......... C02F 9/00; C02F 1/001; C02F 1/5236; C02F 1/66; C02F 2103/06; C08F 289/00; C04B 35/6303; C04B 35/63444; C04B 2235/349; C04B 2235/442; C04B 2235/447; C04B 2235/448
See application file for complete search history.

(56) References Cited

U.S. PATENT DOCUMENTS

| | | | |
|---|---|---|---|
| 8,790,496 B2 * | 7/2014 | Duesel, Jr. ............... | B01D 1/14 203/12 |
| 2014/0175015 A1 * | 6/2014 | Nishimi ................... | B01J 20/12 210/667 |

FOREIGN PATENT DOCUMENTS

| | | | |
|---|---|---|---|
| CN | 102352256 | 2/2012 | |
| CN | 105316051 | 2/2016 | |
| CN | 105418079 | 3/2016 | |
| CN | 106145962 | 11/2016 | |
| CN | 106187082 | 12/2016 | |
| CN | 106187082 A | * 12/2016 | ............. Y02P 40/69 |
| CN | 106747482 | 5/2017 | |

OTHER PUBLICATIONS

"International Search Report (Form PCT/ISA/210)", dated Apr. 25, 2018, with English translation thereof, pp. 1-6.

* cited by examiner

*Primary Examiner* — Noah S Wiese
(74) *Attorney, Agent, or Firm* — JCIPRNET

(57) ABSTRACT

A method for preparing a thinning ceramic additive using a landfill leachate, comprising the following steps: filtering the landfill leachate; adding aqueous alkali and regulating pH to 7.5-9; adding a coagulant, then stirring and mixing with a blender; taking precipitates to mix with water to prepare a solution, adding a sodium hydroxide solution for alkalization, and regulating the pH to 7-8.5; adding a sulfonating agent, and reacting under an environment of 80-100° C. for 2-4 h; adding acrylic acid and N,N'-methylene bisacrylamide to the solution, then slowly adding the initiator, stirring under the condition of 80-90° C. to react for 1-3.5 h, and after the reaction is completed, drying the solution to obtain a solid matter; crushing the solid matter, and screening through a screen of 16-24 meshes; and uniformly mixing the above screened particulate matter with the montmorillonite and an additive to prepare the thinning ceramic additive.

12 Claims, No Drawings

METHOD FOR PREPARING THINNING CERAMIC ADDITIVE USING LANDFILL LEACHATE

CROSS-REFERENCE TO RELATED APPLICATION

This application is a 371 application of International PCT application serial no. PCT/CN2018/073742, filed on Jan. 23, 2018, which claims the priority benefit of Chinese application no. 201710062865.4, filed on Jan. 24, 2017. The entirety of each of the abovementioned patent applications is hereby incorporated by reference herein and made a part of this specification.

BACKGROUND

Technical Field

The present invention relates to the field of ceramic additives, and particularly to a method for preparing a thinning ceramic additive using landfill leachate.

Description of Related Art

As a large country in ceramic production, China has ranked first in the world in ceramic yield for several years. The yield of domestic ceramics accounts for about 70% of the global yield, the yield of artistic ceramics for furnishing accounts for 65% of the global yield, and the yield of architectural ceramics accounts for about 50% of the global total yield. However, because China is a country with relatively poor energy and resources, and the ceramic industry is an industry which is highly dependent on energy and resources, over 100 million tons of high-quality raw mineral materials are consumed every year. The energy consumption is equivalent to approximately over 30 million tons of standard coal. As a high-energy consumption industry, the ceramic industry takes the cost of energy such as power and fuel consumed in each process from the preparation of slurry to the burning of products for 23%-40% of the total cost of ceramic production. Therefore, energy saving and consumption reduction will be the trend of ceramic production, and also an important condition for the sustainable development of the ceramic industry. In ceramic production, different additives are often added to meet the requirements of various processes. Although the dosage is small, the additives play an important role. The adding amount of the additives also affects the appearance and physical properties of finished products.

In addition, with the acceleration of social and economic development and urbanization of China, the amount of urban garbage in China has been increasing very rapidly. However, in the process of disposing a lot of municipal solid waste, a lot of garbage is piled up or buried in the open air, which not only occupies a lot of land, but also makes it easy to cause great secondary pollution to soil, groundwater and atmosphere, thereby generating serious environmental problems. The garbage will produce rich humic acid during aerobic fermentation, while the humic acid is an amorphous organic polymer compound which is modified to have a large space network structure to act as a ceramic additive to greatly improve the binding effect between ceramic particles and increase ceramic strength. Therefore, it is of great importance to modify and apply the landfill leachate to the field of production of the ceramic additive to improve the energy utilization environment of China and increase the regeneration utilization rate of the resources.

SUMMARY

To solve the defects in the prior art, the purpose of the present invention is to provide a method for preparing a thinning ceramic additive using landfill leachate having the advantages of simple technology, low cost and applicability to industrial production.

To achieve the above technical purpose, the technical solution of the present invention is:

A method for preparing a thinning ceramic additive using landfill leachate comprises:

using landfill leachate as raw material to successively conduct purification, alkalization, sulfonation and graft copolymerization reactions, and adding montmorillonite and an initiator to prepare a thinning ceramic additive.

Further, the method for preparing the thinning ceramic additive using landfill leachate comprises the following steps:

(1) filtering the landfill leachate to remove suspended matter and solid particles;

(2) adding aqueous alkali to the filtered landfill leachate and regulating pH to 7.5-9;

(3) adding a coagulant to the landfill leachate with the regulated pH, stirring and mixing with a blender at a rotational speed of 2000-2200 rpm for 2-4 min, regulating the rotational speed to 450-550 rpm and then stirring for 9-11 min;

(4) standing and precipitating the stirred mixed solution, taking precipitates to mix with water to prepare the solution, adding a sodium hydroxide solution for alkalization, and regulating the pH to 7-8.5;

(5) adding a sulfonating agent to the solution prepared in step (4), and allowing the solution to react under an environment of 80-100° C. for 2-4 h;

(6) adding acrylic acid and N,N'-methylene bisacrylamide to the solution that reacts in step (5), then slowly adding the initiator, stirring under the condition of 80-90° C. to react for 1-3.5 h, and after the reaction is completed, drying the solution to obtain solid matter;

(7) crushing the solid matter prepared by drying, and screening the solid matter through a screen of 16-24 meshes; and (8) uniformly mixing the above screened particulate matter with the montmorillonite and an additive to prepare the thinning ceramic additive.

Further, the added mass fractions of the components in each step are:

| | |
|---|---|
| landfill leachate | 36%-40%; |
| coagulant | 0.03%-0.06%; |
| sulfonating agent | 0.17%-0.3%; |
| acrylic acid | 8.7%-10%; |
| N,N'-methylene bisacrylamide | 0.0085%-0.01%; |
| Initiator | 0.017%-0.019%; |
| Montmorillonite | 21%-23%; |
| Water | 25%-27%; |
| Additive | 5%-9%. |

Further, the solution mixed by the precipitates in the step (4) and the water has a solid content of 55%-63%.

Further, the coagulant is a cation coagulant and is formed by mixing more than one of malysite, aluminium salt and a polymer of malysite and aluminium salt.

Further, the sulfonating agent is formed by mixing more than one of sulphuric acid, oleum, chlorosulfonic acid and sulfur trioxide.

Further, the initiator is formed by mixing more than one of potassium persulfate, ammonium persulfate and sodium persulfate.

Further, the additive is formed by mixing more than one of sodium silicate, sodium tripolyphosphate, sodium metasilicate pentahydrate, sodium carbonate and sodium hexametaphosphate.

Further, the relative molecular mass Mn of the thinning ceramic additive is 4600-25000.

An application of the ceramic additive prepared by the above method comprises: adding the ceramic additive in accordance with 0.3%-0.8% of the total mass of ceramic blanks into the ceramic blanks to act as the additive for preparing ceramics.

By adopting the above technical solution, the present invention has the following beneficial effects: the landfill leachate is subjected to pretreatment, coagulation, alkalization, sulfonation and graft copolymerization reactions and is modified with the ceramic additive, so as to enhance the binding effect among ceramic particles. Meanwhile, the modified landfill leachate also includes a large number of carboxyl groups. This hydrophilic group can play good roles in water reduction and dispersion for ceramic blanks. In addition, the montmorillonite and other additives which are favorable for further enhancing the strengthening, splashing and dispersion effects of the ceramic additive are also added to additive components. In the method, the landfill leachate in disposing of the garbage is effectively used as raw material, thereby realizing recycling of the resources and having a positive effect on environmental protection and the increase of economic benefits.

DESCRIPTION OF THE EMBODIMENTS

A method for preparing a thinning ceramic additive using landfill leachate comprises: using landfill leachate as raw material to successively conduct purification, alkalization, sulfonation and graft copolymerization reactions, and adding montmorillonite and an initiator to prepare a thinning ceramic additive.

Further, the method for preparing the thinning ceramic additive using landfill leachate comprises the following steps:

(1) filtering the landfill leachate to remove suspended matter and solid particles;

(2) adding aqueous alkali to the filtered landfill leachate and regulating pH to 7.5-9;

(3) adding a coagulant to the landfill leachate with the regulated pH, stirring and mixing with a blender at a rotational speed of 2000-2200 rpm for 2-4 min, regulating the rotational speed to 450-550 rpm and then stirring for 9-11 min;

(4) standing and precipitating the stirred mixed solution, taking precipitates to mix with water to prepare the solution, adding a sodium hydroxide solution for alkalization, and regulating the pH to 7-8.5;

(5) adding a sulfonating agent to the solution prepared in step (4), and allowing the solution to react under an environment of 80-100° C. for 2-4 h;

(6) adding acrylic acid and N,N'-methylene bisacrylamide to the solution that reacts in step (5), then slowly adding the initiator, stirring under the condition of 80-90° C. to react for 1-3.5 h, and after the reaction is completed, drying the solution to obtain solid matter;

(7) crushing the solid matter prepared by drying, and screening the solid matter through a screen of 16-24 meshes; and (8) uniformly mixing the above screened particulate matter with the montmorillonite and an additive to prepare the thinning ceramic additive.

Further, the added mass fractions of the components in each step are:

| | |
|---|---|
| landfill leachate | 36%-40%; |
| coagulant | 0.03%-0.06%; |
| sulfonating agent | 0.17%-0.3%; |
| acrylic acid | 8.7%-10%; |
| N,N'-methylene bisacrylamide | 0.0085%-0.01%; |
| Initiator | 0.017%-0.019%; |
| montmorillonite | 21%-23%; |
| water | 25%-27%; |
| additive | 5%-9%. |

Further, the solution mixed by the precipitates in the step (4) and the water has a solid content of 55%-63%.

Further, the coagulant is a cation coagulant and is formed by mixing more than one of malysite, aluminium salt and a polymer of malysite and aluminium salt.

Further, the sulfonating agent is formed by mixing more than one of sulphuric acid, oleum, chlorosulfonic acid and sulfur trioxide.

Further, the initiator is formed by mixing more than one of potassium persulfate, ammonium persulfate and sodium persulfate.

Further, the additive is formed by mixing more than one of sodium silicate, sodium tripolyphosphate, sodium metasilicate pentahydrate, sodium carbonate and sodium hexametaphosphate.

Further, the relative molecular mass Mn of the thinning ceramic additive is 4600-25000.

An application of the ceramic additive prepared by the above method comprises: adding the ceramic additive in accordance with 0.3%-0.8% of the total mass of ceramic blanks into the ceramic blanks to act as the additive for preparing ceramics.

Embodiment 1

A method for preparing a thinning ceramic additive using landfill leachate comprises the following steps:

(1) filtering 38 Kg of the landfill leachate to remove suspended matter and solid particles;

(2) adding sodium hydroxide solution to the filtered landfill leachate and regulating pH to 7.5;

(3) adding 0.05 Kg of sodium sulphate octadecahydrate to the landfill leachate with the regulated pH, stirring and mixing with a blender at a rotational speed of 2000 rpm for 2 min, regulating the rotational speed to 450 rpm and then stirring for 9 min;

(4) standing and precipitating the stirred mixed solution, taking precipitates to mix with water to prepare a solution with a solid content of 58%, adding the sodium hydroxide solution for alkalization, and regulating the pH to 7;

(5) adding 0.194 Kg of sodium sulfite to the solution prepared in step (4), and allowing the solution to react under an environment of 80° C. for 2 h;

(6) adding 10 Kg of acrylic acid and 0.009 Kg of N,N'-methylene bisacrylamide to the solution that reacts in step (5), then slowly adding 0.017 Kg of ammonium persulfate as the initiator, stirring under the condition of 80° C.

to react for 1 h, and after the reaction is completed, drying the solution to obtain solid matter;

(7) crushing the solid matter prepared by drying, and screening the solid matter through a screen of 20 meshes; and (8) stirring and uniformly mixing the above screened particulate matter with 21 Kg of montmorillonite, 2 Kg of sodium tripolyphosphate, 3.73 Kg of sodium metasilicate pentahydrate and 25 Kg of water to prepare the thinning ceramic additive, wherein the relative molecular mass of the prepared thinning ceramic additive is 4600.

Performance Test

The ceramic blanks after grinding classification are placed in a ball milling pot. The above prepared ceramic additive that accounts for 0.3% of the total mass of the blanks is added, and an appropriate amount of water is added to regulate the water content of the blanks as 6%. The material is ground with a rapid grinder for 2 h. After ball milling is completed, sampling is conducted for a slurry fluidity test, and the blanks are made into samples with a specification of 70 mm×30 mm×5 mm for a breaking strength test.

Embodiment 2

A method for preparing a thinning ceramic additive using landfill leachate comprises the following steps:

(1) filtering 37 Kg of the landfill leachate to remove suspended matter and solid particles;

(2) adding sodium hydroxide solution to the filtered landfill leachate and regulating pH to 8;

(3) adding 0.043 Kg of sodium sulphate octadecahydrate to the landfill leachate with the regulated pH, stirring and mixing with a blender at a rotational speed of 2000 rpm for 3 min, regulating the rotational speed to 450 rpm and then stirring for 10 min;

(4) standing and precipitating the stirred mixed solution, taking precipitates to mix with water to prepare a solution with a solid content of 56%, adding the sodium hydroxide solution for alkalization, and regulating the pH to 8;

(5) adding 0.194 Kg of sodium sulfite to the solution prepared in step (4), and allowing the solution to react under an environment of 85° C. for 3 h;

(6) adding 9 Kg of acrylic acid and 0.009 Kg of N,N'-methylene bisacrylamide to the solution that reacts in step (5), then slowly adding 0.018 Kg of potassium persulfate as the initiator, stirring under the condition of 85° C. to react for 2 h, and after the reaction is completed, drying the solution to obtain solid matter;

(7) crushing the solid matter prepared by drying, and screening the solid matter through a screen of 20 meshes; and (8) stirring and uniformly mixing the above screened particulate matter with 22 Kg of montmorillonite, 3.73 Kg of sodium tripolyphosphate, 2 Kg of sodium silicate and 26 Kg of water to prepare the thinning ceramic additive, wherein the relative molecular mass of the prepared thinning ceramic additive is 10000.

Performance Test

The ceramic blanks after grinding classification are placed in a ball milling pot. The above prepared ceramic additive that accounts for 0.5% of the total mass of the blanks is added, and an appropriate amount of water is added to regulate the water content of the blanks as 6%. The material is ground with a rapid grinder for 2 h. After ball milling is completed, sampling is conducted for a slurry fluidity test, and the blanks are made into samples with a specification of 70 mm×30 mm×5 mm for a breaking strength test.

Embodiment 3

A method for preparing a thinning ceramic additive using landfill leachate comprises the following steps:

(1) filtering 36 Kg of the landfill leachate to remove suspended matter and solid particles;

(2) adding sodium hydroxide solution to the filtered landfill leachate and regulating pH to 8.5;

(3) adding 0.03 Kg of iron sulfate heptahydrate to the landfill leachate with the regulated pH, stirring and mixing with a blender at a rotational speed of 2100 rpm for 3 min, regulating the rotational speed to 500 rpm and then stirring for 11 min;

(4) standing and precipitating the stirred mixed solution, taking precipitates to mix with water to prepare a solution with a solid content of 55%, adding the sodium hydroxide solution for alkalization, and regulating the pH to 8;

(5) adding 0.23 Kg of chlorosulfonic acid to the solution prepared in step (4), and allowing the solution to react under an environment of 90° C. for 4 h;

(6) adding 9.311 Kg of acrylic acid and 0.01 Kg of N,N'-methylene bisacrylamide to the solution that reacts in step (5), then slowly adding 0.019 Kg of sodium persulfate as the initiator, stirring under the condition of 90° C. to react for 3 h, and after the reaction is completed, drying the solution to obtain solid matter;

(7) crushing the solid matter prepared by drying, and screening the solid matter through a screen of 20 meshes; and (8) stirring and uniformly mixing the above screened particulate matter with 23 Kg of montmorillonite, 4 Kg of sodium hexametaphosphate, 2.5 Kg of sodium silicate and 25 Kg of water to prepare the thinning ceramic additive, wherein the relative molecular mass of the prepared thinning ceramic additive is 12000.

Performance Test

The ceramic blanks after grinding classification are placed in a ball milling pot. The above prepared ceramic additive that accounts for 0.7% of the total mass of the blanks is added, and an appropriate amount of water is added to regulate the water content of the blanks as 6%. The material is ground with a rapid grinder for 2 h. After ball milling is completed, sampling is conducted for a slurry fluidity test, and the blanks are made into samples with a specification of 70 mm×30 mm×5 mm for a breaking strength test.

Embodiment 4

A method for preparing a thinning ceramic additive using landfill leachate comprises the following steps:

(1) filtering 39.5 Kg of the landfill leachate to remove suspended matter and solid particles;

(2) adding sodium hydroxide solution to the filtered landfill leachate and regulating pH to 8.5;

(3) adding 0.05 Kg of iron sulfate heptahydrate to the landfill leachate with the regulated pH, stirring and mixing with a blender at a rotational speed of 2200 rpm for 4 min, regulating the rotational speed to 550 rpm and then stirring for 11 min;

(4) standing and precipitating the stirred mixed solution, taking precipitates to mix with water to prepare a solution with a solid content of 61%, adding the sodium hydroxide solution for alkalization, and regulating the pH to 8.5;

(5) adding 0.3 Kg of sulphuric acid to the solution prepared in step (4), and allowing the solution to react under an environment of 95° C. for 4 h;

(6) adding 9.1225 Kg of acrylic acid and 0.0085 Kg of N,N'-methylene bisacrylamide to the solution that reacts in step (5), then slowly adding 0.019 Kg of ammonium persulfate as the initiator, stirring under the condition of 90° C. to react for 3 h, and after the reaction is completed, drying the solution to obtain solid matter;

(7) crushing the solid matter prepared by drying, and screening the solid matter through a screen of 20 meshes; and (8) stirring and uniformly mixing the above screened particulate matter with 21 Kg of montmorillonite, 3 Kg of sodium tripolyphosphate, 2 Kg of sodium carbonate and 25 Kg of water to prepare the thinning ceramic additive, wherein the relative molecular mass of the prepared thinning ceramic additive is 20000.

Performance Test

The ceramic blanks after grinding classification are placed in a ball milling pot. The above prepared ceramic additive that accounts for 0.8% of the total mass of the blanks is added, and an appropriate amount of water is added to regulate the water content of the blanks as 6%. The material is ground with a rapid grinder for 2 h. After ball milling is completed, sampling is conducted for a slurry fluidity test, and the blanks are made into samples with a specification of 70 mm×30 mm×5 mm for a breaking strength test.

Embodiment 5

A method for preparing a thinning ceramic additive using landfill leachate comprises the following steps:

(1) filtering 40 Kg of the landfill leachate to remove suspended matter and solid particles;

(2) adding sodium hydroxide solution to the filtered landfill leachate and regulating pH to 9;

(3) adding 0.06 Kg of iron sulfate heptahydrate to the landfill leachate with the regulated pH, stirring and mixing with a blender at a rotational speed of 2100 rpm for 2 min, regulating the rotational speed to 550 rpm and then stirring for 11 min;

(4) standing and precipitating the stirred mixed solution, taking precipitates to mix with water to prepare a solution with a solid content of 63%, adding the sodium hydroxide solution for alkalization, and regulating the pH to 8;

(5) adding 0.17 Kg of sodium sulfite to the solution prepared in step (4), and allowing the solution to react under an environment of 100° C. for 2 h;

(6) adding 8.7 Kg of acrylic acid and 0.0085 Kg of N,N'-methylene bisacrylamide to the solution that reacts in step (5), then slowly adding 0.018 Kg of ammonium persulfate as the initiator, stirring under the condition of 90° C. to react for 1 h, and after the reaction is completed, drying the solution to obtain solid matter;

(7) crushing the solid matter prepared by drying, and screening the solid matter through a screen of 20 meshes; and (8) stirring and uniformly mixing the above screened particulate matter with 21.0425 Kg of montmorillonite, 3 Kg of sodium hexametaphosphate, 2 Kg of sodium carbonate and 25 Kg of water to prepare the thinning ceramic additive, wherein the relative molecular mass of the prepared thinning ceramic additive is 6000.

Performance Test

The ceramic blanks after grinding classification are placed in a ball milling pot. The above prepared ceramic additive that accounts for 0.4% of the total mass of the blanks is added, and an appropriate amount of water is added to regulate the water content of the blanks as 6%.

The material is ground with a rapid grinder for 2 h. After ball milling is completed, sampling is conducted for a slurry fluidity test, and the blanks are made into samples with a specification of 70 mm×30 mm×5 mm for a breaking strength test.

Embodiment 6

A method for preparing a thinning ceramic additive using landfill leachate comprises the following steps:

(1) filtering 36 Kg of the landfill leachate to remove suspended matter and solid particles;

(2) adding sodium hydroxide solution to the filtered landfill leachate and regulating pH to 9;

(3) adding 0.03 Kg of aluminium sulphate octadecahydrate to the landfill leachate with the regulated pH, stirring and mixing with a blender at a rotational speed of 2000 rpm for 2 min, regulating the rotational speed to 500 rpm and then stirring for 10 min;

(4) standing and precipitating the stirred mixed solution, taking precipitates to mix with water to prepare a solution with a solid content of 56%, adding the sodium hydroxide solution for alkalization, and regulating the pH to 8.5;

(5) adding 0.17 Kg of sodium sulfite to the solution prepared in step (4), and allowing the solution to react under an environment of 90° C. for 2 h;

(6) adding 8.7 Kg of acrylic acid and 0.01 Kg of N,N'-methylene bisacrylamide to the solution that reacts in step (5), then slowly adding 0.017 Kg of potassium persulfate as the initiator, stirring under the condition of 90° C. to react for 1 h, and after the reaction is completed, drying the solution to obtain solid matter;

(7) crushing the solid matter prepared by drying, and screening the solid matter through a screen of 16 meshes; and (8) stirring and uniformly mixing the above screened particulate matter with 21.073 Kg of montmorillonite, 4 Kg of sodium metasilicate pentahydrate, 4 Kg of sodium silicate and 25 Kg of water to prepare the thinning ceramic additive, wherein the relative molecular mass of the prepared thinning ceramic additive is 18000.

Performance Test

The ceramic blanks after grinding classification are placed in a ball milling pot. The above prepared ceramic additive that accounts for 0.6% of the total mass of the blanks is added, and an appropriate amount of water is added to regulate the water content of the blanks as 6%.

The material is ground with a rapid grinder for 2 h. After ball milling is completed, sampling is conducted for a slurry fluidity test, and the blanks are made into samples with a specification of 70 mm×30 mm×5 mm for a breaking strength test.

Embodiment 7

A method for preparing a thinning ceramic additive using landfill leachate comprises the following steps:

(1) filtering 36 Kg of the landfill leachate to remove suspended matter and solid particles;

(2) adding sodium hydroxide solution to the filtered landfill leachate and regulating pH to 9;

(3) adding 0.06 Kg of aluminium sulphate octadecahydrate to the landfill leachate with the regulated pH, stirring and mixing with a blender at a rotational speed of 2000 rpm for 4 min, regulating the rotational speed to 550 rpm and then stirring for 11 min;

(4) standing and precipitating the stirred mixed solution, taking precipitates to mix with water to prepare a solution with a solid content of 55%, adding the sodium hydroxide solution for alkalization, and regulating the pH to 8.5;

(5) adding 0.17 Kg of sodium sulfite to the solution prepared in step (4), and allowing the solution to react under an environment of 80° C. for 3 h;

(6) adding 9 Kg of acrylic acid and 0.01 Kg of N,N'-methylene bisacrylamide to the solution that reacts in step (5), then slowly adding 0.019 Kg of potassium persulfate as the initiator, stirring under the condition of 85° C. to react for 2 h, and after the reaction is completed, drying the solution to obtain solid matter;

(7) crushing the solid matter prepared by drying, and screening the solid matter through a screen of 24 meshes; and (8) stirring and uniformly mixing the above screened particulate matter with 21 Kg of montmorillonite, 3 Kg of sodium hexametaphosphate, 3.741 Kg of sodium carbonate and 27 Kg of water to prepare the thinning ceramic additive, wherein the relative molecular mass of the prepared thinning ceramic additive is 25000.

Performance Test

The ceramic blanks after grinding classification are placed in a ball milling pot. The above prepared ceramic additive that accounts for 0.8% of the total mass of the blanks is added, and an appropriate amount of water is added to regulate the water content of the blanks as 6%. The material is ground with a rapid grinder for 2 h. After ball milling is completed, sampling is conducted for a slurry fluidity test, and the blanks are made into samples with a specification of 70 mm×30 mm×5 mm for a breaking strength test.

Reference Example

The ceramic blanks after grinding classification are placed in a ball milling pot. An appropriate amount of water is added to regulate the water content of the blanks as 6%. Then, the material is ground with a rapid grinder for 2 h. After ball milling is completed, sampling is conducted for a slurry fluidity test, and the blanks are made into samples with a specification of 70 mm×30 mm×5 mm for a breaking strength test.

Test results of the above embodiments 1-7 and the reference example are shown in the following table:

| Additive Type | Engler Viscosity (s) | Fluidity Change (%) | Breaking Strength (MPa) | Breaking Strength Change (%) |
|---|---|---|---|---|
| Blank Reference Example | 105.2 | — | 2.0 | — |
| Embodiment 1 | 99.4 | +5.5% | 3.3 | +65% |
| Embodiment 2 | 103.1 | +2.0% | 3.2 | +60% |
| Embodiment 3 | 106.9 | −1.6% | 3.36 | +68% |
| Embodiment 4 | 109.9 | −4.5% | 3.3 | +65% |
| Embodiment 5 | 100.1 | +4.8% | 3.2 | +60% |
| Embodiment 6 | 107.6 | −2.3% | 3.24 | +62% |
| Embodiment 7 | 110.6 | −5.1% | 3.38 | +69% |

The above are embodiments of the present invention. For those ordinary skilled in the art, according to the instruction of the present invention, equivalent changes, amendments, replacements and variations made in accordance with the scope of the application patent of the present invention without departing from the principle and the spirit of the present invention shall belong to the scope of the present invention.

What is claimed is:

1. A method for preparing a thinning ceramic additive using a landfill leachate as raw material to successively conduct purification, alkalization, sulfonation and graft copolymerization reactions, and adding a montmorillonite and an initiator to prepare the thinning ceramic additive, wherein the method comprises the following steps:
   (1) filtering the landfill leachate to remove suspended matter and solid particles;
   (2) adding aqueous alkali to the filtered landfill leachate and regulating pH to 7.5-9;
   (3) adding a coagulant to the landfill leachate after regulating the pH, stirring and mixing with a blender at a rotational speed of 2000-2200 rpm for 2-4 min, regulating the rotational speed to 450-550 rpm and then stirring for 9-11 min;
   (4) standing and precipitating the stirred mixed solution, taking precipitates to mix with water to prepare a solution, adding a sodium hydroxide solution for alkalization, and regulating the pH to 7-8.5;
   (5) adding a sulfonating agent to the solution prepared in step (4), and allowing the solution to react under an environment of 80-100° C. for 2-4 h;
   (6) adding acrylic acid and N,N'-methylene bisacrylamide to the solution after reacting in step (5), then slowly adding the initiator, stirring under the condition of 80-90° C. to react for 1-3.5 h, and after the reaction is completed, drying the solution to obtain a solid matter;
   (7) crushing the solid matter prepared by drying, and screening the solid matter through a screen of 16-24 meshes; and
   (8) uniformly mixing the above screened particulate matter with the montmorillonite and an additive to prepare the thinning ceramic additive.

2. The method for preparing the thinning ceramic additive using the landfill leachate according to claim 1, wherein the added mass fractions of the components in each step are:

| | |
|---|---|
| landfill leachate | 36%-40%; |
| coagulant | 0.03%-0.06%; |
| sulfonating agent | 0.17%-0.3%; |
| acrylic acid | 8.7%-10%; |
| N,N'-methylene bisacrylamide | 0.0085%-0.01%; |
| Initiator | 0.017%-0.019%; |
| Montmorillonite | 21%-23%; |
| water | 25%-27%; |
| additive | 5%-9%. |

3. The method for preparing the thinning ceramic additive using the landfill leachate according to claim 1, wherein the solution mixed by the precipitates and the water in the step (4) has a solid content of 55%-63%.

4. The method for preparing the thinning ceramic additive using the landfill leachate according to claim 1, wherein the coagulant is a cation coagulant and is formed by mixing more than one of malysite, aluminium salt and a polymer of malysite and aluminium salt.

5. The method for preparing the thinning ceramic additive using the landfill leachate according to claim 1, wherein the sulfonating agent is formed by mixing more than one of sulphuric acid, oleum, chlorosulfonic acid and sulfur trioxide.

6. The method for preparing the thinning ceramic additive using the landfill leachate according to claim 1, wherein the initiator is formed by mixing more than one of potassium persulfate, ammonium persulfate and sodium persulfate.

7. The method for preparing the thinning ceramic additive using the landfill leachate according to claim 1, wherein the additive is formed by mixing more than one of sodium silicate, sodium tripolyphosphate, sodium metasilicate pentahydrate, sodium carbonate and sodium hexametaphosphate.

8. The method for preparing the thinning ceramic additive using the landfill leachate according to claim 1, wherein the relative molecular mass Mn of the thinning ceramic additive is 4600-25000.

9. The method for preparing the thinning ceramic additive using the landfill leachate according to claim 2, wherein the coagulant is a cation coagulant and is formed by mixing more than one of malysite, aluminium salt and a polymer of malysite and aluminium salt.

10. The method for preparing the thinning ceramic additive using the landfill leachate according to claim 2, wherein the sulfonating agent is formed by mixing more than one of sulphuric acid, oleum, chlorosulfonic acid and sulfur trioxide.

11. The method for preparing the thinning ceramic additive using the landfill leachate according to claim 2, wherein the initiator is formed by mixing more than one of potassium persulfate, ammonium persulfate and sodium persulfate.

12. The method for preparing the thinning ceramic additive using the landfill leachate according to claim 2, wherein the additive is formed by mixing more than one of sodium silicate, sodium tripolyphosphate, sodium metasilicate pentahydrate, sodium carbonate and sodium hexametaphosphate.

* * * * *